United States Patent [19]
McKenney et al.

[11] 3,779,693
[45] Dec. 18, 1973

[54] CHARCOAL IGNITING APPARATUS

[76] Inventors: Neal D. McKenney, 777 Mulberry St.; John Dennis, Jr., 963 Walnut St., both of Macon, Ga. 31201

[22] Filed: Mar. 15, 1972

[21] Appl. No.: 234,885

[52] U.S. Cl............... 431/327, 431/326, 126/25 B, 110/1 F
[51] Int. Cl............................................. F23q 13/04
[58] Field of Search.................. 431/287, 326, 327; 126/25 B; 110/1 F

[56] References Cited
UNITED STATES PATENTS

| | | | |
|---|---|---|---|
| 3,176,752 | 4/1965 | Huston | 431/327 |
| 2,065,265 | 12/1936 | Bock | 431/326 |
| 2,604,922 | 7/1952 | Theisen | 431/327 |
| 1,003,550 | 9/1911 | Umbenhaur | 431/327 |
| 176,705 | 4/1876 | Sweetland | 431/327 |
| 96,532 | 11/1869 | Fuller | 431/327 |
| 417,588 | 12/1889 | Richardson | 431/326 |
| 3,018,771 | 1/1962 | Curtis | 431/327 |

*Primary Examiner*—Carroll B. Dority, Jr.
*Attorney*—D. C. Roylance et al.

[57] ABSTRACT

Apparatus is disclosed to be placed in an outdoor charcoal barbeque or in an indoor fireplace below the charcoal or wood to ignite the charcoal or wood. The apparatus comprises a metal container having ceramic chips supported therein so that the chips can be soaked by ignitable fluid and ignited to provide a uniform heat to the charcoal, wood or other combustible material supported above the chips.

8 Claims, 3 Drawing Figures

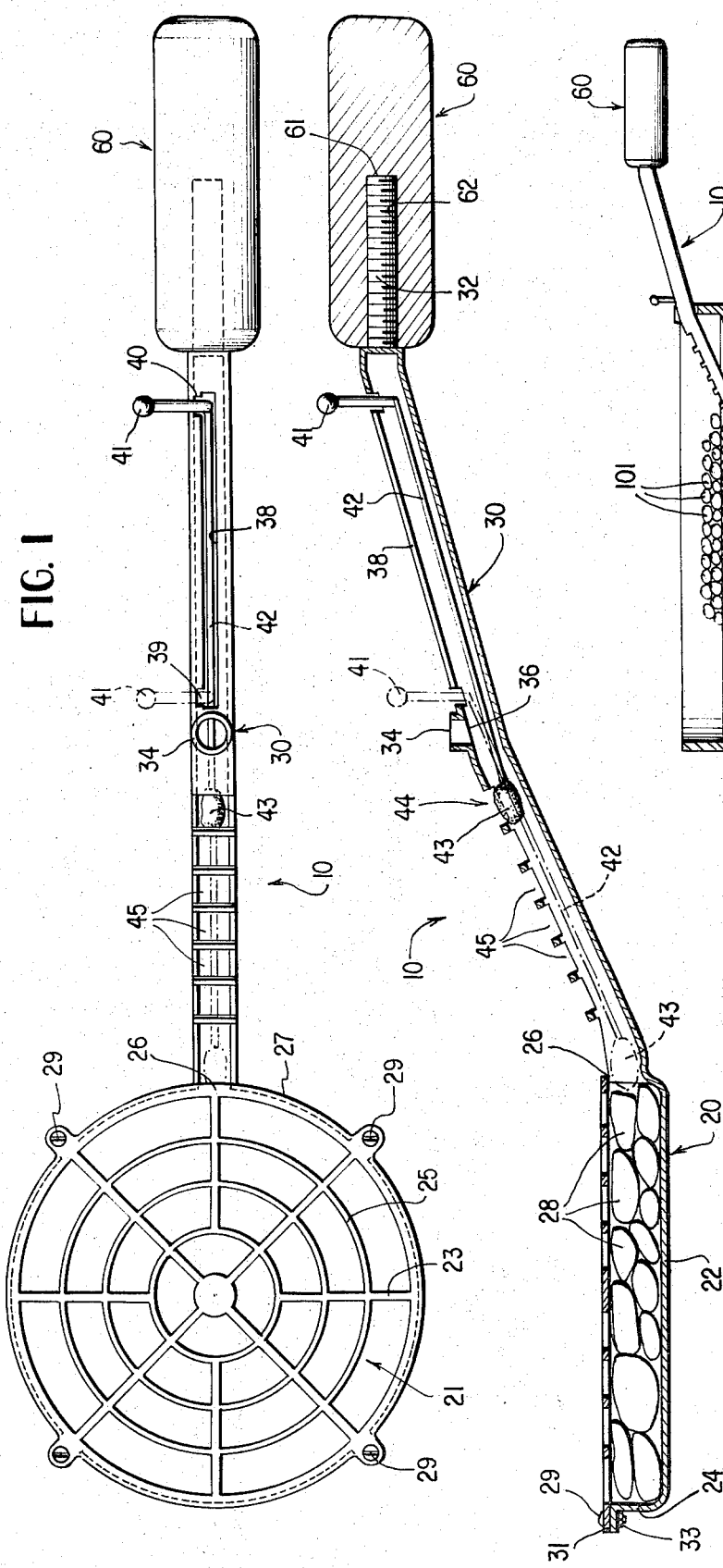

CHARCOAL IGNITING APPARATUS

The present invention relates to apparatus for igniting charcoal in an outdoor barbeque or wood in an indoor fireplace. The prior art has disclosed three different methods and apparatus for igniting charcoal or wood. One type of prior art device utilizes electrical current to heat a metallic coil disposed among charcoal. The second type of prior art device utilizes combustible fuel located beneath the charcoal wherein the fuel is ignited and burns completely causing the charcoal to ignite. The third type of prior art device utilizes a combustible fuel stored in a reservoir and conveyed to the charcoal where it is ignited and in turn ignites the charcoal.

However, the prior art devices all have various limitations and drawbacks. The electrical type has a drawback insofar as an electrical outlet must be convenient to the barbeque and there are instances where such an outlet is not available. Also, the coil which is heated by the electrical current provides a thin line of heat and nonuniformly heats the charcoal. The type of prior art device utilizing totally combustible material has a drawback insofar as the material which is ignited to in turn ignite the charcoal leaves a considerable residue. Additionally, such a device is usually expensive to provide since it can be used one time only. The third type of prior art device has a drawback insofar as necessarily a very cumbersome supply of combustible material must be provided, and there is a danger in having such a supply of combustilbe material permanently located near the fire.

It is an object of the present invention to overcome the limitations and drawbacks associated with the aforesaid prior art devices and to provide a new and improved device for igniting charcoal and similar combustible materials.

Another object of the present invention is to provide an inexpensive, portable and easily usable device to ignite charcoal in a barbeque and similar combustible materials.

A further object is to provide a safe and efficient device for igniting charcoal.

A further object is to provide a uniform heating of the charcoal in a barbeque from the bottom up and to provide a more efficient use of the charcoal.

Other objects, advantages and salient features of the present invention will become apparent from the following detailed description, which, taken in conjunction with the annexed drawings, discloses a preferred embodiment of the present invention.

Referring now to the drawings which form a part of this original disclosure:

FIG. 1 is a top view of a device in accordance with the present invention;

FIG. 2 is a longitudinal sectional view of the device shown in FIG. 1;

FIG. 3 is a longitudinal sectional view of the device in place in a barbeque.

The foregoing objects are attained by providing a charcoal igniting device which consists of a metal pan or container containing ceramic chips which is to be placed beneath the charcoal in a barbeque or wood in a fireplace. Fuel is poured through a port, flows to the pan and is absorbed by the ceramic chips. A movable wick is provided to safely ignite the fuel in the chips. The burning of the fuel absorbed by the chips heats the chips and uniformly ignites the charcoal or wood.

Referring to the drawings in further detail, the device of the present invention is generally designated 10. The device consists generally of a metal pan or container 20, an elongated member 30 and a handle 60.

The metal pan 20 consists of a circular flat bottom 22 and a circumferential wall 24 as shown in FIG. 2. The diameter of the flat bottom 22 is preferably about one-third the total length of the entire device 10, and the height of the circumferential wall 24 is preferably one-quarter the diameter of the flat bottom 22. The circumferential wall 24 is integrally formed with the flat bottom 22, extends substantially completely around the circumference of circular flat bottom 22 and is essentially perpendicular to the flat bottom 22. There is a gap 26 of approximately 15° in the circumferential wall 24 as shown in FIG. 1.

Ceramic chips 28 are located in the support formed by the flat bottom 22 and the circumferential wall 24. These chips can be formed of any suitable type of ceramic material.

Mounted on the top portion of the circumferential wall 24 and parallel to the flat bottom 22 is a circular grill 21 whose center point coincides with the center point of the flat bottom 22. Grill 21 is formed from at least eight radial spokes 23 and at least four spaced concentric circular members 25 which are formed integrally with the spokes. Each radial spoke is separated from the ones adjacent to it by approximately 45° and extends substantially from the center point of circular grill 21 to the circumferential wall 24. The concentric circular members 25 are evenly spaced from each other in the radial direction and the outermost concentric circular member 27 substantially coincides with the top of circumferential wall 24. Screws 29, passing through threaded projections 31 in the member 27 and corresponding threaded projections 33 in wall 24, are utilized to mount grill 21 to circumferential wall 24.

Extending from metal pan 20 at gap 26 in circumferential wall 24 is an elongated member 30. This member 30 is approximately one-third the length of the entire device 10, is tubular, and has a central bore therein. Member 30 is integrally formed at its one end to the circumferential wall 24 and bottom 22 and extends upwards at an angle to the flat bottom 22 of approximately 45°. There is a slight bend at the midpoint of member 30 having an angle of about 5°.

Connected at the end of the member 30 spaced from the integral connection with pan 20 is a cylindrically shaped threaded portion 32 having external threads. The threaded portion 32 has a diameter of approximately one-half that of member 30 and is disposed parallel to the flat bottom 22.

A cylindrically shaped handle 60 is mounted on elongated member 30 at the threaded portion 32. The handle 60 has a cylindrical central bore 61 at one end with internal threads 62 therein. Threads 62 correspond to and mesh with the threads 32 and thus secure the handle 60 to the member 30.

Since the threaded portion 32 is parallel to the flat bottom 22 and the handle 60 is mounted on the threaded portion 32, the handle 60 is parallel to the flat bottom 22. Handle 60 is preferably formed from material which is non-conductive or from material which is a poor conductor of heat.

Midway between the ends of elongated member 30 and on the top portion of elongated member 30 there is located a circular aperture 36. Coinciding with aperture 36 is circular port 34. Port 34 is formed from a cylindrical tube having one end cut perpendicularly to its central axis and the other end cut at an angle of 45° to its central axis. The last mentioned end is mounted on the elongated member 30 coincidental with aperture 36. This provides the port with an external opening having a circumferential plane parallel to the plane of the flat bottom 22.

Located on the top portion of elongated member 30 between port 34 and handle 60 is a slot 38 as shown in FIG. 1. Slot 38 is arranged parallel to the central axis of the elongated member 30. One end of the slot 38 is slightly spaced from the port 34 and the other end of the slot 38 is slightly spaced from the handle 60. At the ends of the slot 38, notched areas 39, 40 extend to one side of the slot 38.

Carried in the slot 38 is a bolt handle 41 which is movable between the notched areas 39 and 40. The bolt handle 41 extends vertically upright as it moves through the slot 38, as shown in FIG. 2. However, at either notched area 39 or 40, the handle can be folded laterally, as shown in FIG. 1. The bolt handle 41 is fixedly connected at one end to an elongated rod 42. Rod 42 is movable through the central bore of member 30 substantially parallel to its central axis. Connected at the other end of the rod 42 is a wick 43. Wick 43 is formed from ignitable materal and is of size which will allow it to fit into the central bore of the member 30 with radial clearance. The ignitable material from which the wick is formed can be ceramic. Elongated rod 42 is of a length such that when bolt handle 41 is in notched area 40, the wick 43 will extend beyond port 34 to at least the point designated 44 on elongated member 30, as shown in FIG. 2. When the bolt handle 41 is in the notched area 39, the wick 43 will extend into gap 26, as shown in phantom in FIG. 2.

The upper portion of the elongated member 30 located between point 24 and gap 26 is partially cut away to form a series of spaced openings 45 as seen in FIGS. 1 and 2.

In a preferred embodiment which accomplishes the objects of the instant invention, the diameter of pan 20 is 5 inches, the length of handle 60 is 4 inches, the length of elongated member 30 is 10 inches and the diameter of elongated member is 1 inch.

In operation, the device 10 is first loaded with ceramic chips 28 and bolt handle 41 is positioned at the notched area 40 with the wick 43 positioned at the point 44. Fuel such as lighter fluid or some other ignitable liquid is poured into the device through port 34 and flows down elongated member 30 into pan 20. The ceramic chips lying in the pan 20 are fully soaked by the fuel and some of the fuel is also absorbed by the wick 43. The device is then placed in the bottom of a barbeque 100 and charcoal 101 is placed in the barbeque substantially covering the device as shown in FIG. 3. Wick 43 is then ignited by a match or other lighter. Bolt handle 41 is moved through the slot 38 to the notched area 39, thus moving burning wick 43 from point 44 to gap 26. The wick will receive sufficient air to contine its burning due to the cut away portions 45 in elongated member 30. At gap 26 the burning wick will ignite the fuel soaked into ceramic chips 28. The chips will then be heated by the ignited fuel and will continue to provide a uniform source of heat to the charcoal 101 supported by the grill 21. Bolt handle 41 is then moved from the notched are 39 back to the notched area 40, thereby moving the wick 43 from the gap 26 back to the point 44 where it is extinguished or where it will eventually burn out as the fuel is used up.

In approximately 5 minutes, the charcoal will be uniformly ignited and the entire device 10 is removed. To extinguish the burning fuel in the ceramic chips, the apparatus can be placed in a metal container thereby cutting off the air supply. This will help prevent the combustion of the ceramic chips. Also, due to the fact that the fuel burns out before the chips 28 are totally burnt, the chips 28 can be reused up to 50 times. The amount of lighter fluid necessary for each use of the device has been determined to be about one and one-half ounces.

The device 10 can also be used to ignite wood in a fireplace in an analogous manner.

While one advantageous embodiment has been chosen to illustrate the invention, it will be understood by those skilled in the art that various changes and modofications can be made therein without departing from the scope of the invention as defined in the appended claims.

What is claimed is:

1. A charcoal igniting device comprising
a container adapted to be positioned beneath the charcoal to be ignited;
ceramic chip means disposed within said container;
means for introducing combustible fuel into said container; and
means for igniting said combustible fuel within said container to heat said ceramic chip means until the temperature thereof is elevated sufficiently to provide a uniform source of heat beneath said charcoal,
said means for introducing combustible fuel including
an elongated member connected to said container, said elongated member having a central bore therein, one end of said central bore directly communicating with the interior of said container,
a handle mounted at the end of said elongated member which is spaced from said container, and
a port in said elongated member communicating with said central bore therein, said port being for the reception of the combustible fuel, which fuel can flow from said port, through said central bore into said container;
said means for igniting said combustible fuel including
an ignitable wick means positioned in said central bore of said elongated member; and
means for moving said wick means between a first position in said central bore adjacent said port where said wick means can be ignited and a second position in said central bore adjacent said container where said wick means can ignite the fuel in said container.

2. A charcoal igniting device according to claim 1 wherein said means for moving said ignitable wick means includes
a longitudinal slot means located in said elongated member;
a rod connected at one end to said ignitable wick means and located in said central bore; and a bolt handle connected to said rod and adapted to pass through and be movable along said slot means between a first and second position.

3. A charcoal igniting device according to claim 1 further including a series of spaced openings in the top portion of said elongated member between said port and said container for providing air to said ignitable wick means.

4. A charcoal igniting device according to claim 2 further including a notched area at each end of said slot means for engaging said bolt handle when said bolt handle is in its first and second positions respectively.

5. A charcoal igniting device according to claim 1 further including a grill mounted on the top of said container for supporting charcoal thereon.

6. A charcoal igniting device according to claim 1 wherein said ignitable wick means is a piece of ceramic material.

7. A charcoal igniting device according to claim 1 wherein said handle is formed from material which is a poor conductor of heat.

8. A charcoal igniting device according to claim 3 wherein
said port is located in said elongated member such that, when said wick means is in said first position, said wick means is located between said port and said container so that fuel poured into said port and flowing through said central bore soaks said wick so that it may be ignited.

* * * * *